(12) United States Patent
Cho et al.

(10) Patent No.: US 7,663,982 B2
(45) Date of Patent: Feb. 16, 2010

(54) LIGHT DELIVERY MODULE, METHOD OF FABRICATING THE SAME AND HEAT-ASSISTED MAGNETIC RECORDING HEAD USING THE LIGHT DELIVERY MODULE

(75) Inventors: Eun-hyoung Cho, Seoul (KR); Sung-dong Suh, Seoul (KR); Hae-sung Kim, Hwaseong-si (KR); Myung-bok Lee, Suwon-si (KR); Jin-seung Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 11/512,354

(22) Filed: Aug. 30, 2006

(65) Prior Publication Data
US 2007/0165494 A1    Jul. 19, 2007

(30) Foreign Application Priority Data
Jan. 14, 2006   (KR) ............... 10-2006-0004171

(51) Int. Cl.
*G11B 11/00* (2006.01)

(52) U.S. Cl. ................ 369/13.32; 369/13.17

(58) Field of Classification Search ........... 369/13.32, 369/13.17, 13.13, 13.33, 13.14, 112.27, 13.02; 360/110, 59, 125.03; 385/38, 129
See application file for complete search history.

(56) References Cited

U.S. PATENT DOCUMENTS 6,795,630 B2* 9/2004 Challener et al. .......... 385/129
7,154,707 B2 12/2006 Watabe et al.
7,272,079 B2* 9/2007 Challener ................ 369/13.17
7,272,102 B2* 9/2007 Challener .............. 369/112.27
7,412,143 B2* 8/2008 Rottmayer et al. .......... 385/129

FOREIGN PATENT DOCUMENTS

| JP | 09-044923 A | 2/1997 |
|---|---|---|
| JP | 10-073722 A | 3/1998 |
| JP | 2002-332390 A | 11/2002 |
| JP | 2003-045004 A | 2/2003 |
| JP | 2004-295987 A | 10/2004 |
| JP | 2005-004901 A | 1/2005 |

* cited by examiner

*Primary Examiner*—Ali Neyzari
(74) *Attorney, Agent, or Firm*—Sughrue Mion, PLLC

(57) ABSTRACT

A light delivery module, a method of fabricating the same, a heat-assisted magnetic recording head using the light delivery module are provided. The light delivery module delivers light emitted from a light source. The light delivery module includes an optical waveguide having an inclined plane of an angle $\Phi$ with respect to an incident light axis to deliver an incident light, and a nano aperture changing an energy distribution of the light delivered through the inclined plane to generate an enhanced near-field. The heat-assisted magnetic recording head is mounted on one end of a slider with an air bearing surface to perform a recording operation on a recording medium. The heat-assisted magnetic recording head includes a magnetic path forming unit forming a magnetic field for recording, a light source emitting light for heating a predetermined region of a recording surface of the recording medium, and the light delivery module.

10 Claims, 9 Drawing Sheets

LIGHT DELIVERY MODULE, METHOD OF FABRICATING THE SAME AND HEAT-ASSISTED MAGNETIC RECORDING HEAD USING THE LIGHT DELIVERY MODULE

CROSS-REFERENCE TO RELATED PATENT APPLICATION

This application claims priority from Korean Patent Application No. 10-2006-0004171, filed on Jan. 14, 2006, in the Korean Intellectual Property Office, the disclosure of which is incorporated herein in its entirety by reference.

BACKGROUND OF THE INVENTION

1. Field of the Invention

The present invention relates to a heat-assisted magnetic recording head capable of a high-density recording, and more particularly, to a light delivery module that can be fabricated in an integrated fashion while providing an enhanced near-field, and a heat-assisted magnetic recording head using the light delivery module.

2. Description of the Related Art

In the field of the magnetic recording heads, research on high-density magnetic recording continues. A recording density of 100 Gbit/in$^2$ has been achieved in a longitudinal magnetic recording, and a recording density of 100 Gbit/in$^2$ or more may be possible in a perpendicular magnetic recording. However, the magnetic recording technology has a limitation in providing a high recording density because of a thermal instability of recording bit due to a super paramagnetic effect.

A thermal stability in a recoding medium is determined by a ratio of magnetic anisotropy energy to thermal energy. To increase the magnetic anisotropy energy, a magnetic recording medium must be formed of a material with a strong coercive force. When the magnetic recording medium is formed of a material with a high coercive force, a correspondingly high magnetic field is required for recording. However, since the magnetic field is saturated to a predetermined level at a tip portion of a small-sized recording head for improving a recording density, a generated magnetic field has a limited strength and thus recording is impossible.

To solve this problem, a heat-assisted magnetic recording (HAMR) method has been under development. In the HAMR method, the coercive force of the corresponding position is temporarily decreased by heating a local portion of the recoding medium above the Curie temperature. When compared to the related art magnetic recording method, the HAMR method can further reduce the strength of a magnetic field required for recording.

At this point, since a region on which the data is recorded is heated above the Curie temperature, the recording density is determined by the width of the heated portion, not by the size of a pole generating a magnetic field in a gap. For example, when a heating unit is a laser diode, a data recording density is determined by the spot size of a laser light emitted from the laser diode. Accordingly, an optical unit for reducing the size of a light spot and providing a high-intensity light is required.

FIG. 1 is a view of an example of a related art HAMR head. Referring to FIG. 1, an HAMR head 22 includes a magnetic recording unit 24, a light source 52 heating a magnetic recoding medium 16, and a light delivery module 26 delivering the light from the light source 52 to the magnetic recording medium 16.

The magnetic recording unit 24 includes a coil 33 generating a magnetic field for recording, a recording pole 30 applying the magnetic field to the magnetic recording medium 16, and a return yoke 32 magnetically connected to the recording pole 30 to form a magnetic path H. The recording pole 30 includes a first layer 46 and a second layer 48.

The light delivery module 26 includes an optical waveguide 50 delivering light emitted from the light source 31, and an optical fiber 54 connecting the light source 52 to the optical waveguide 50. Light energy is delivered to the magnetic recording medium 16 through a heat discharge surface 56 formed on one end of the optical waveguide 50. Accordingly, a predetermined portion of the recording medium 16 is heated and its coercive force is reduced.

The magnetic recording medium 16 relatively moves in a direction of an arrow A with respect to the HAMR head 22. Accordingly, the heated portion of the magnetic recording medium 16 is positioned on the recording pole 30 through the relative motion. Accordingly, the recording pole 30 can easily perform a magnetic recording operation on the heated portion. The heated portion of the magnetic recording medium 16 is cooled after the magnetic recording operation. Accordingly, the cooled portion of the magnetic recording medium 16 restores the original strong coercive force and thus maintains a thermally-stable recording bit.

To perform the high-density recording through the HAMR head, the light spot must be able to sufficiently heat the magnetic recording medium while being small in size. However, this structure cannot provide a field enhancement effect. Moreover, the optical waveguide must be fabricated separately from the magnetic head and must be precisely aligned.

Additionally, a focused ion beam (FIB) process, which is accompanied by a nano aperture process for field enhancement, is low in resolution. This causes a process error, leading to deterioration of the field enhancement characteristics.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a light delivery module capable of high-density recording by realizing a light spot with a small size and high intensity, an HAMR head using the light delivery module, and a method of fabricating the light delivery module.

According to an aspect of the present invention, there is provided a light delivery module delivering light emitted from a light source, the light delivery module including: an optical waveguide having an inclined plane of an angle $\Phi$ with respect to an incident light axis to deliver an incident light; and a nano aperture changing an energy distribution of the light delivered through the inclined plane to generate an enhanced near-field, wherein the angle $\Phi$ of the inclined plane satisfies the following equation, a. $\Phi = 90° - \theta_{iB}$ b. where $\theta_{iB}$ represents a Brewster's angle allowing at which only a vertically polarized light of the incident light is reflected.

According to another aspect of the present invention, there is provided an HAMR head mounted on one end of a slider with an air bearing surface to perform recording on a recording medium, the HAMR head including: a magnetic path forming unit forming a magnetic field for recording; a light source emitting light for heating a predetermined region of a recording surface of the recording medium; and the above light delivery module.

According to another aspect of the present invention, there is provided a method of fabricating a light delivery module including an optical waveguide delivering light from a light source, and a nano aperture having a slit surrounded by a metal thin film, the nano aperture serving as a near-field optical unit enhancing the light delivered from the optical waveguide, the method including: performing an electron beam lithography to form a mold with an engraved space corresponding to the optical waveguide and the slit on a first substrate; coating at least one layer forming the optical waveguide and the slit on a second substrate and pre-baking the resulting structure; stamping the mold on the second substrate and post-baking the resulting structure; and depositing a metal film surrounding the slit on the second substrate.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
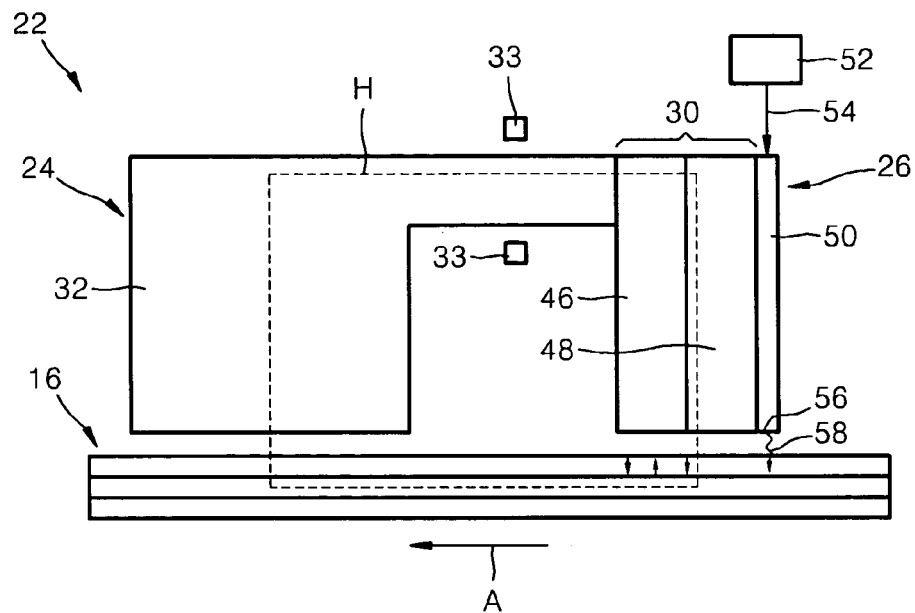
FIG. 1 is a view of a related art HAMR head.
Figure 2:
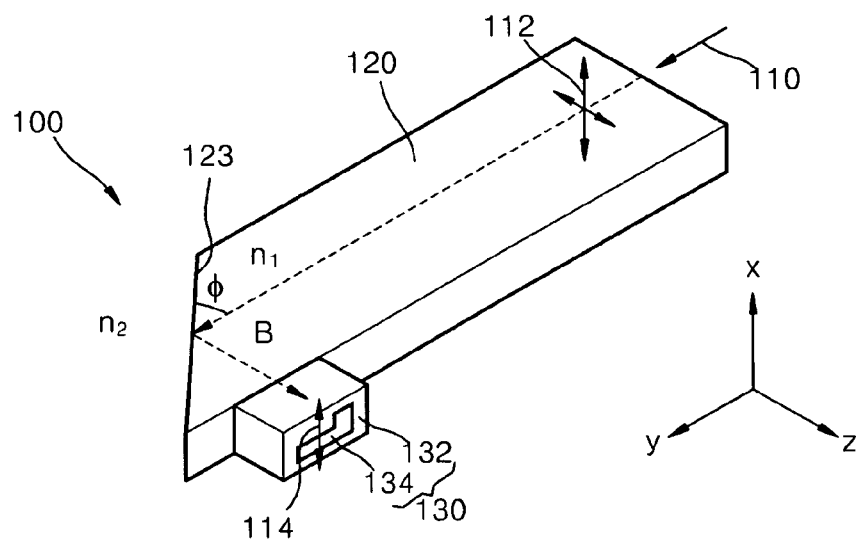
FIG. 2 is a perspective view of a light delivery module according to an exemplary embodiment of the present invention.

FIG. 2 is a perspective view of a light delivery module 100 according to an exemplary embodiment of the present invention. Referring to FIG. 2, the light delivery module 100 includes an optical waveguide 120 delivering light 110 emitted from a light source (not shown), and a nano aperture 130 changing the energy distribution of the delivered light to generate an enhanced near field.

An inclined plane 123 is formed at one end of the optical waveguide 120 to change the path of the delivered light toward the nano aperture 130. An arrow B represents an optical axis direction of an incident light. The inclined plane 123 is inclined at a predetermined angle Φ with respect to the arrow B. The angle Φ has an optimized value for maximizing the energy of the emitted light, which can be given by the following Equation 1.

$$\Phi = 90° - \theta_{iB} \qquad (1)$$

where $\theta_{iB}$ represents an incident angle at which only a vertically polarized wave among incident waves is reflected, which is defined as a Brewster's angle. The Brewster's angle can be given by the following Equation 2.

$$\theta_{iB} = \tan^{-1}(n_2/n_1) \qquad (2)$$

where $n_1$ represents a refractive index of the optical waveguide 120 and $n_2$ represents a refractive index of an outside of the optical waveguide 120 with respect to the inclined plane 123. That is, only a vertically polarized wave 114 is reflected when light of an arbitrary polarized wave 112 is incident at the Brewster's angle on a boundary surface between a medium with a refractive index $n_1$ and another medium with a refractive index $n_2$.

The nano aperture 130 has the structure of a slit 134 formed on a metal thin film 132. An electric field is enhanced in the middle of the narrow slit 134 by vibration of an electric dipole, and thus the light energy of a broad region is concentrated on a local region. The slit 134 may be formed in various shapes such as a bow-tie shape, an X shape, and a C shape as well as an L-shape illustrated in FIG. 2.

An operational principle of the present invention will now be described in detail with reference to FIGS. 3 through 6.

Figure 3:
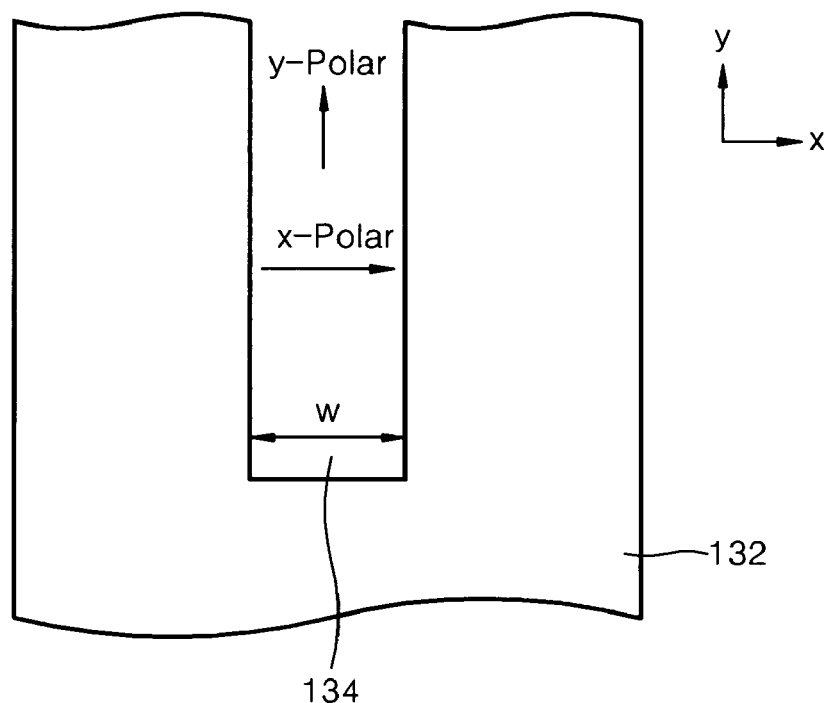
FIG. 3 is a view illustrating polarization of light passing though a nano-aperture slit.

FIG. 3 is a view illustrating polarization of light passing though the slit 134 of the nano aperture 130. Referring to FIG. 3, the light passing through the slit 134 can be divided into an x-polar light polarized in an x-direction and a y-polar light polarized in a y-direction. Since the traveling direction of the light is a z-direction, an incident plane is a y-z plane. That is, a polarized light in the x-direction corresponds to a vertically polarized light and a polarized light in the y-direction corresponds to a horizontally polarized light.

Figure 4:
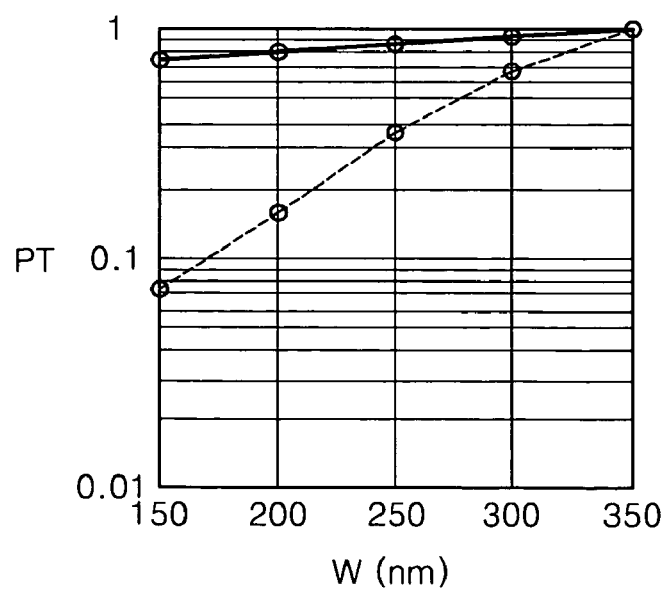
FIG. 4 is a graph illustrating the simulation result of an optical power throughput depending on the width w of the nano-aperture slit.

FIG. 4 is a graph illustrating the simulation result of an optical power throughput (PT) of the vertically polarized wave and the horizontally polarized wave depending on the width w of the slit 134 of the nano aperture 130. The PT represents a ratio of light energy discharged through the slit 134 to light energy entering in parallel to the slit 134 of the nano aperture 130. A dotted line corresponds to a y-direction polarized light (i.e., horizontally polarized light), and a solid line corresponds to an x-direction polarized light (i.e., vertically polarized light). As can be seen from FIG. 4, in the case of the vertically polarized light, there is a little change of the PT according to the width w of the slit 134 and it maintains a constant level of the PT. In the case of horizontally polarized light, when the width of the slit 134 is large, it has characteristics similar to those of the vertically polarized light. However, the PT of the horizontally polarized light decreases as the width w of the slit 134 decreases.

Accordingly, when the light passing through the slit 134 of the nano aperture 130 has only a vertically-polarized component, a field enhancement effect is excellent. As described above, when the inclined plane 123 is inclined at the angle Φ of Equation 1, only vertically polarized light is discharged through the slit 134.

Figure 5:
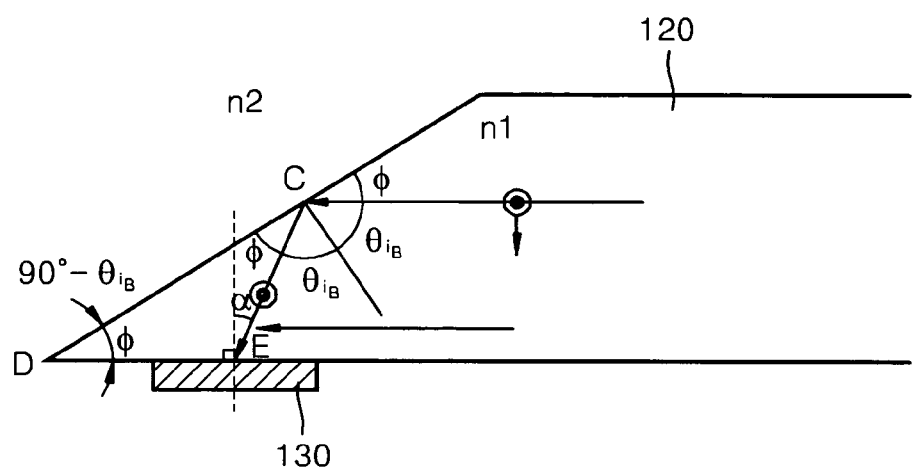
FIG. 5 is a view illustrating the polarization and path of light in the light deliver module according to an exemplary embodiment of the present invention.

FIG. 5 is a view illustrating the polarization and path of light in the light delivery module 100. Light of arbitrary polarization can be represented as the sum of a vertically polarized wave and a horizontally polarized wave. When the light is reflected on the inclined plane with an inclined angle Φ, only the vertically polarized wave is reflected. The reflected light enters the nano aperture 130 at a angel α. It can be seen from a triangle CDE that α=90°−2Φ. For example, when a refractive index of an optical waveguide material is 1.5 and a refractive index of the outside of the optical waveguide is 1, Φ is 56.3° (=90°−tan⁻¹(1/1.5)) and α is −22.60 (=90°−2×56.3°).

Figure 6:
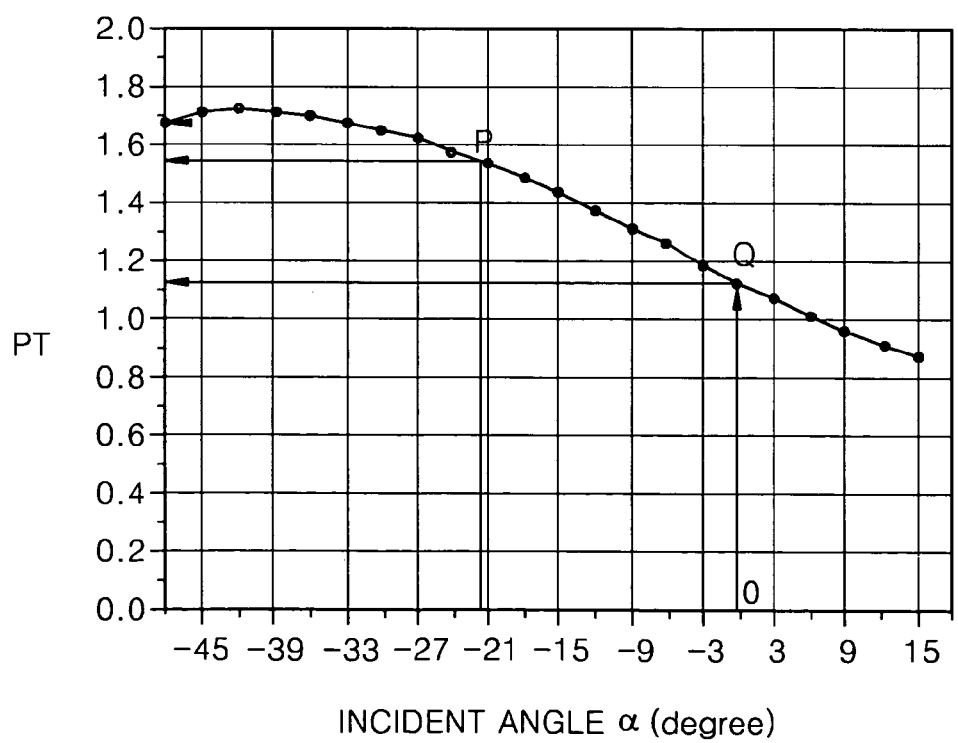
FIG. 6 is a graph illustrating the simulation result of an optical power throughput depending on an incident angle of light entering a nano aperture.

FIG. 6 is a graph illustrating the simulation result of the PT of discharged light according to an incident angle of light entering the nano aperture 130. In the graph, an incident angle is changed while polarization is maintained. When comparing a point P with an incident angle of −22.6° with a point Q of a vertical incidence, the PT at the point P is enhanced by about 1.1 to 1.5.

That is, when the inclined plane 123 is inclined at the angle Φ with respect to the optical axis direction as expressed in Equation 1, light enters the nano aperture 130 with an incident angle which enhances the PT characteristics.

Figure 7:
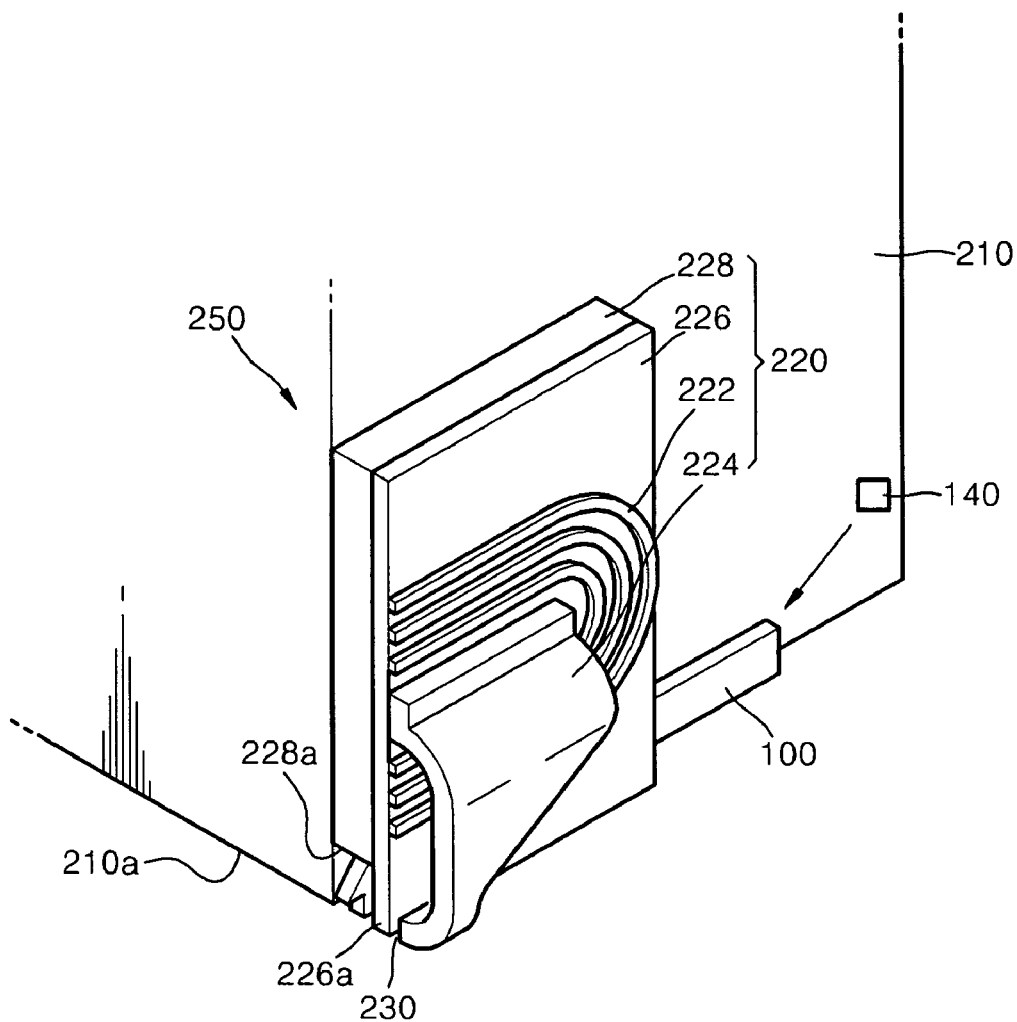
FIGS. 7 through 9 are schematic perspective views of HAMR heads according to exemplary embodiments of the present invention.

FIG. 7 is a schematic perspective view illustrating an HAMR head according to an exemplary embodiment of the present invention. Referring to FIG. 7, an HAMR head 250 includes a magnetic path forming unit 220 forming a magnetic field for recording, a light source 140 emitting light for heating a recording region of a recording medium (not shown), and a light delivery module 100 delivering the light from the light source 140 and generating an enhanced near-field toward the recording medium.

The HAMR head 250 is mounted on one side of a slider with an air bearing surface (ABS) 210 such that one end of the HAMR head 250 coincides with the ABS 210a. As the recording medium with a recording surface facing the ABS 210a is rotated at a high speed, the HAMR head 250 floats with the slider 210 by an air bearing system to maintain a predetermined flying height between the HAMR head 250 and the recording medium.

The magnetic path forming unit 220 includes a coil 222 generating a magnetic field, a return yoke 224 forming a magnetic path of a magnetic field generated around the coil 222, a main pole 226 separated from one end of the return yoke 224 and connected to the other side of the return yoke 224 to form the magnetic path in association with the return yoke 224, and a sub yoke 228 whose one surface is connected to the main pole 226 to form the magnetic path.

Each surface of the return yoke 224 and the main pole 226 facing the recording medium is disposed on the same plane as the ABS 210a. A gap 230 is formed between the one end of the return yoke 224 and the main pole 226. A magnetic field in the main pole 226 leaks outside the main pole 226, and the recording medium is magnetized by the leaked magnetic flux, thereby performing a recording operation.

The sub yoke 228 is formed on a side of the main pole 226. At this point, the sub yoke 228 is disposed such that a step region is formed between a second end 228a of the sub yoke 228 facing the recording medium and a first end 226a of the main pole 226 facing the recording medium.

The sub yoke 228, which is disposed spaced apart from the ABS 210a, allows a magnetic field for the recording to be effectively concentrated on the first end 226a of the main pole 226, causing a leakage flux around the gap 230 to be increased. Since this concentration effect is limited by a value of saturated magnetization, it is desirable that the saturation magnetization value of the main pole material is larger than that of the sub yoke 228.

At least a portion of the light delivery module 100 is disposed in the step region formed between the first end 226a of the main pole 226 and the second end 228a of the sub yoke 228.

The structure of the light delivery module 100 is identical to that of FIG. 2 and thus its description will be omitted for conciseness. According to the aforementioned operational principle, an enhanced light energy is discharged from the light delivery module 100, thereby heating a predetermined region of the recording medium. The heated region with a low coercive force is magnetized by the leaked magnetic flux in the main pole 226, thereby performing a recording operation.

The light in the light source 140 may be butt-coupled to the optical waveguide. Alternatively, the light may be coupled to the optical waveguide using a prism coupler or a grating coupler, for example.

Figure 8:
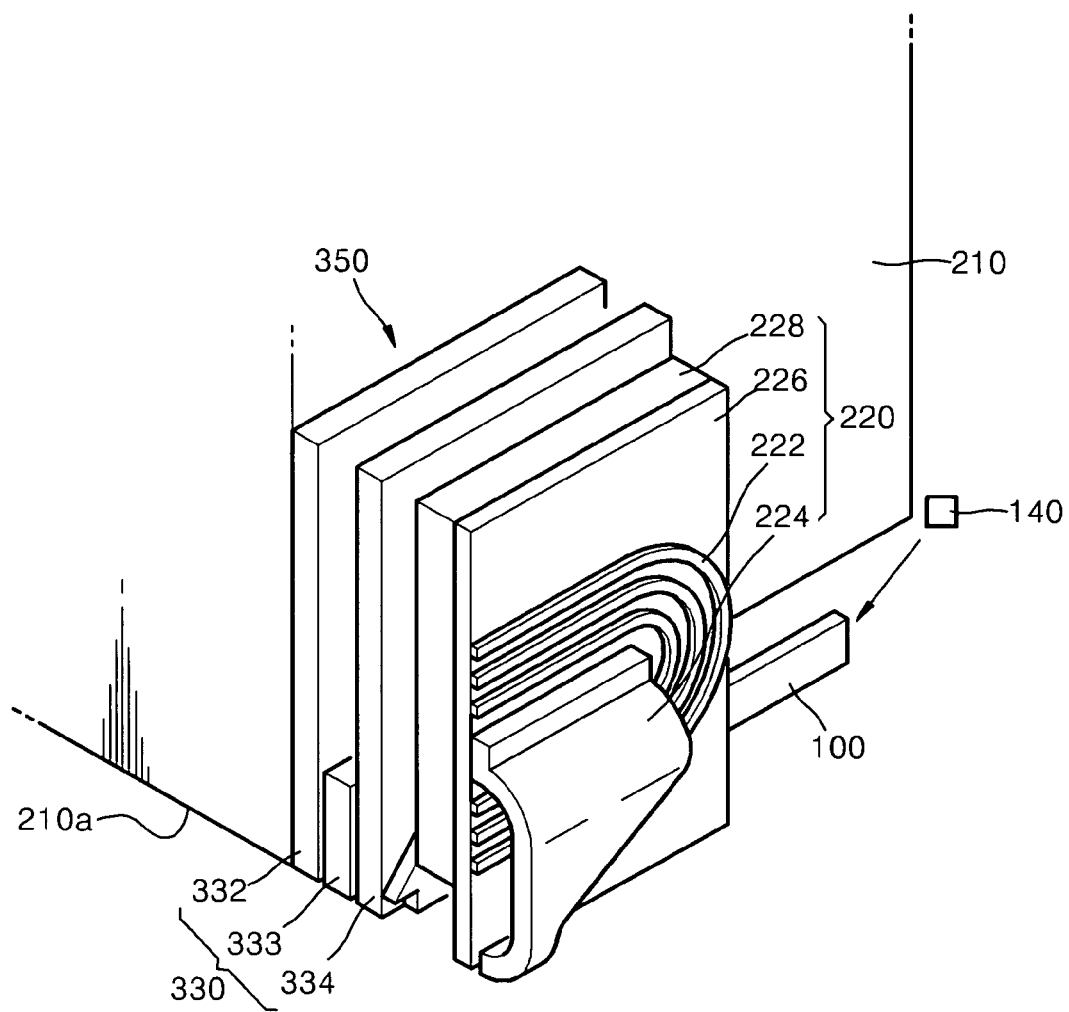

FIG. 8 is a schematic perspective view of an HAMR head according to another exemplary embodiment of the present invention. Referring to FIG. 8, an HAMR head 350 includes a light source 140, a reading head unit 330, a magnetic path forming unit 220, and a light delivery module 100.

The reading head unit 330 includes a first shield 332, a second shield 334, and a reading sensor 333 disposed between the first shield 332 and the second shield 334. Each surface of the first shield 332, the second shield 334, and the reading sensor 333 facing the recording medium is disposed on the same plane as an ABS 210a.

The light delivery module 100 is disposed between the second shield 334 and a sub yoke 228.

The structures of the light delivery module 100 and a magnetic field forming unit 220 are identical to those of FIG. 7 and thus their description will be omitted for conciseness.

Figure 9:
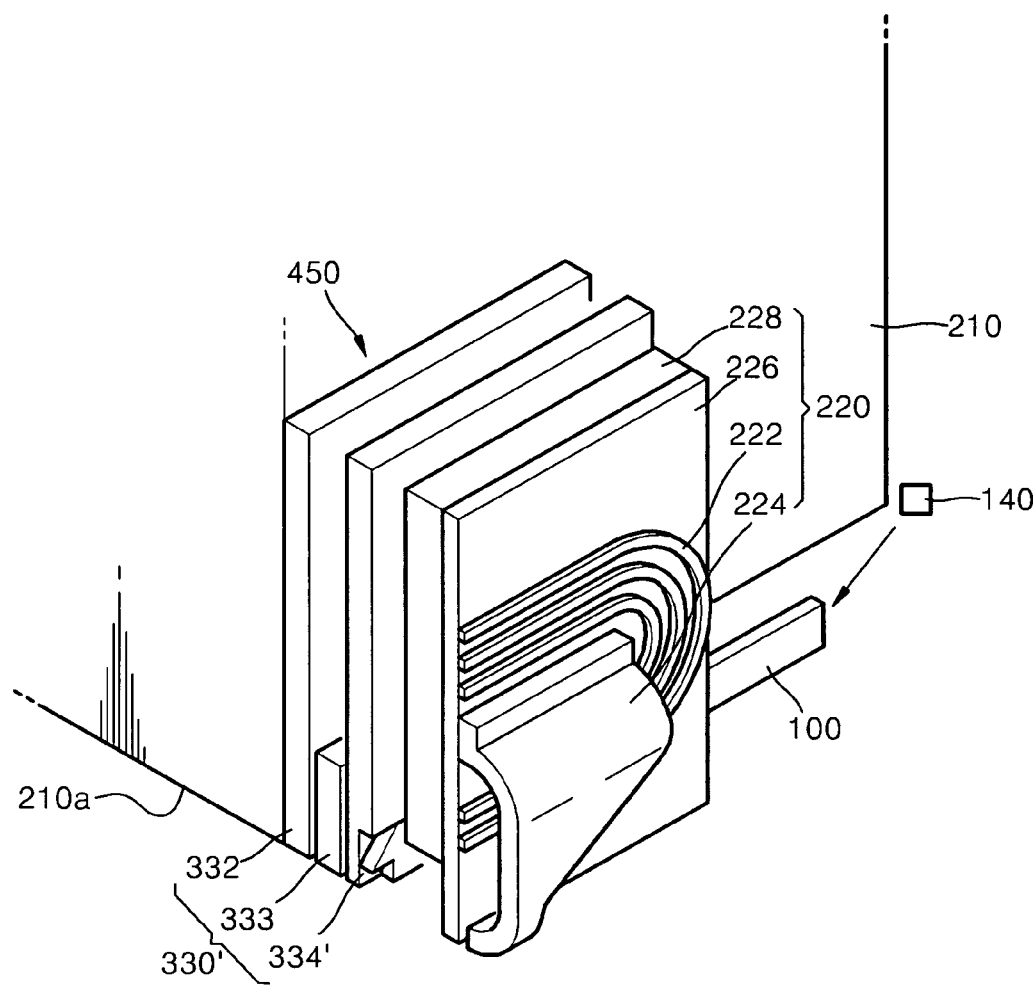

FIG. 9 is a schematic perspective view of an HAMR head according to another exemplary embodiment of the present invention. Like reference numerals in FIGS. 7 through 9 denote like elements. A reading head unit 330' includes a first shield 332, a second shield 334', and a reading sensor 333 disposed between the first shield 332 and the second shield 334'. Each surface of the first shield 332, the second shield 334', and the reading sensor 333 facing the recording medium is disposed on the same plane as the ABS 210a. Unlike the exemplary embodiment of FIG. 8, the surface of the second shield 334' facing the recording medium is stepped from an ABS 210a, and the light delivery module 100 is disposed in the resulting stepped space.

In the exemplary embodiments of FIGS. 7 through 9, the position of the light delivery module 100 can be determined considering the timing of heating the recording medium and performing the magnetic recording. For example, an appropriate distance between the light delivery module 100 and the main pole 226 can be determined considering the cooling time and the rotation speed of the recording medium.

Since the HAMR heads according to the above exemplary embodiments have the light delivery module 100 of which structure maximizes a field enhancement effect and which discharges an optical spot with a small size and high intensity, they are advantageous for the high-density recording.

FIGS. 10A through 10I are sectional views illustrating a method of fabricating a light delivery module according to an exemplary embodiment of the present invention.

Figure 10A:
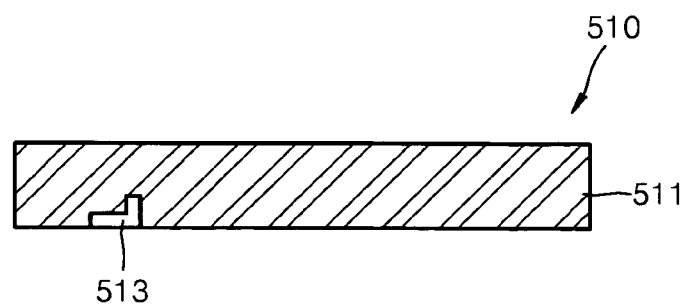
FIGS. 10A through 10I are sectional views illustrating a method of fabricating a light delivery module according to an exemplary embodiment of the present invention.

Referring to FIG. 10A, an electron beam lithography process is performed on a first substrate 511 formed of, for example, quartz to engrave a slit 513 of a nano aperture and an optical waveguide, thereby forming a mold 510.

Figure 10B:
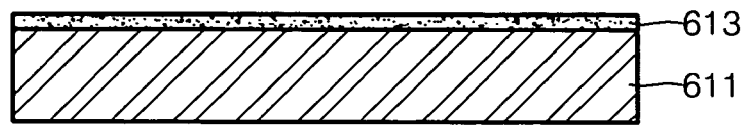

Referring to FIG. 10B, an adhesion promoter 613 is coated on a separately-prepared second substrate 611, and then a baking process is performed on the resulting structure. The second substrate 611 may be, for example, a silicon substrate on which a reading head unit of the HAMR head has been stacked.

Figure 10C:
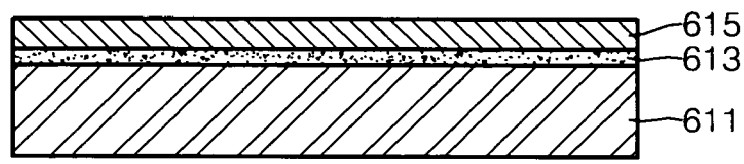

Referring to FIG. 10C, a bottom clad layer 615 is coated on the coated adhesion promoter 613 and then an infrared exposure process and a baking process are performed on the resulting structure. When the bottom clad layer 615 is formed of a polymer, the baking process may be performed at a temperature of 200 degrees Celsius or below.

Figure 10D:
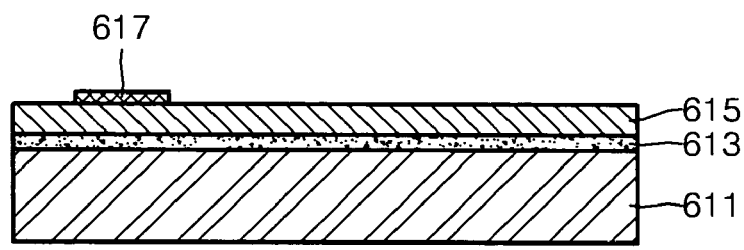

Referring to FIG. 10D, a patterning process is performed to form a first metal layer 617 on the bottom clad layer 615.

Figure 10E:
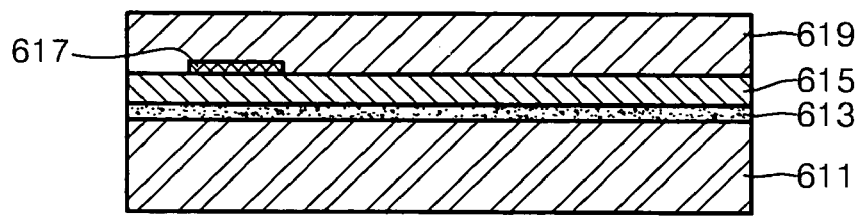

Referring to FIG. 10E, an optical waveguide core layer 619 is coated on the first metal layer 617, and a pre-baking process is performed on the resulting structure. When the optical waveguide core layer 619 is formed of a polymer, the pre-baking process may be performed at a temperature of 200 degrees Celsius or below.

Figure 10F:
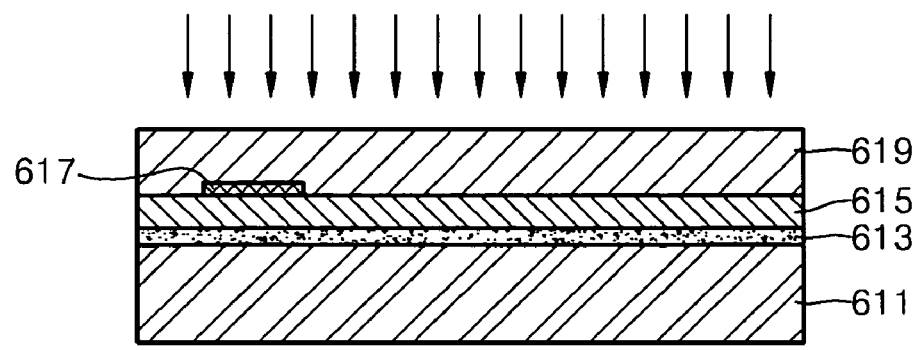

Referring to FIG. 10F, the mold 510 of FIG. 10A is stamped on the pre-baked optical waveguide core layer 619. Thereafter, an infrared exposure process and a post-baking process are performed on the resulting structure.

Figure 10G:
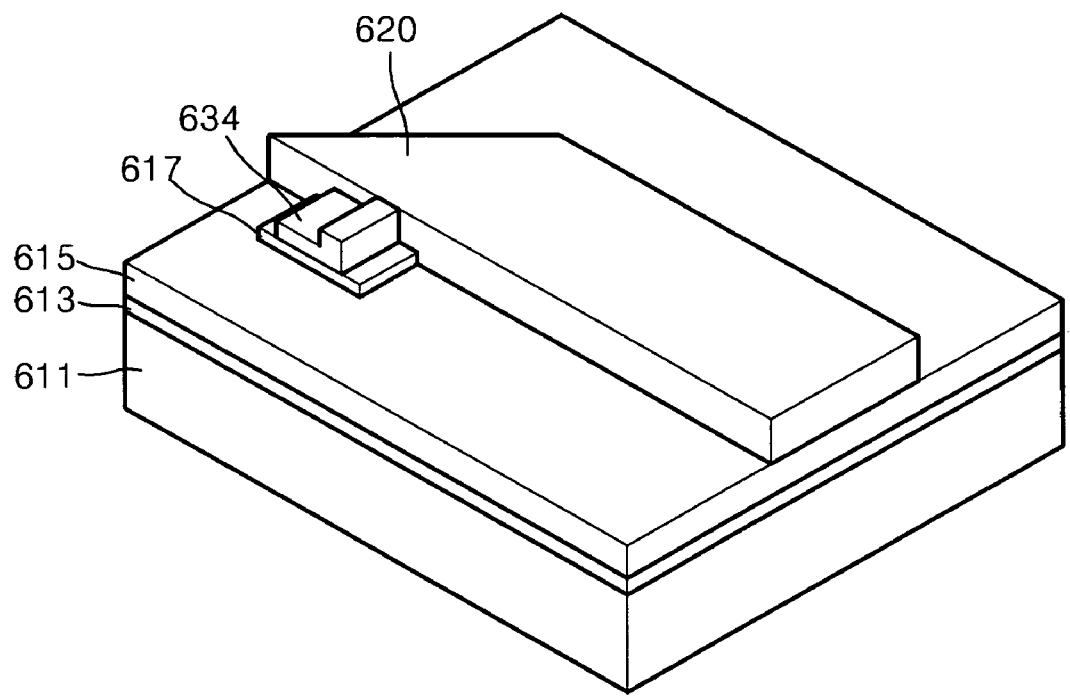

FIG. 10G is a perspective view illustrating processes after the stamping process. Referring to FIG. 10G, a slit 634, the first metal layer 617 and an optical waveguide 620 are formed such that they create a nano aperture.

Figure 10H:
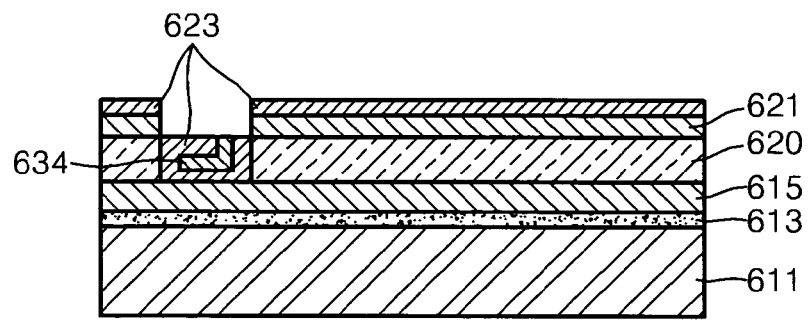

Referring to FIG. 10H, a photoresist 621 is formed on the optical waveguide 620 except for a region to be formed as the nano aperture, and then a second metal layer 623 is deposited on the resulting structure.

Figure 10I:
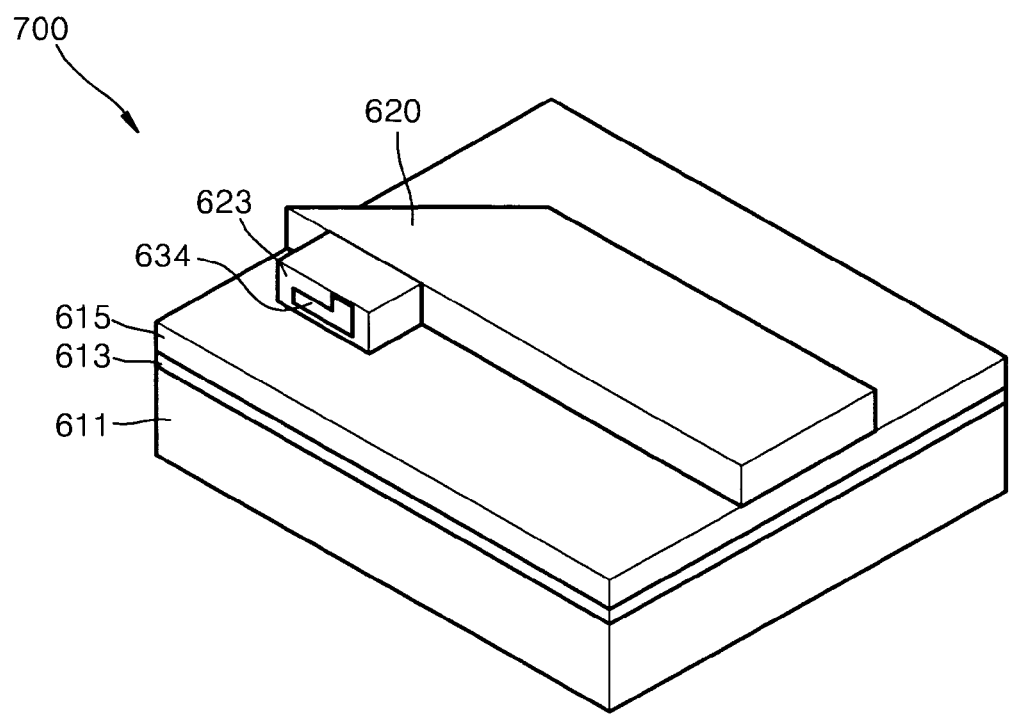

Referring to FIG. 10I, a lift-off process is performed to remove the photoresist 621 and the part of second metal layer 623 deposited on the photoresist 621, thereby completing a light delivery module 700.

As described above, since the light delivery module according to the exemplary embodiment of the present invention includes the optical waveguide having the inclined plane for controlling the polarization characteristics, only the vertically polarized light enters the nano aperture, thereby maximizing the field enhancement effect.

Also, since the HAMR head using the light delivery module provides a light spot with a small size high intensity, it is advantageous for the high-density recording.

Also, since the optical waveguide is formed of a polymer, the method of fabricating the light delivery module can be performed in a low temperature process. Accordingly, the light delivery module can be fabricated in an integrated fashion with respect to the related art magnetic head. Moreover, when compared to the FIB process, the more precise and smaller nano aperture can be implemented by a precise master mold that is manufactured by the electron beam lithography.

While the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light delivery module comprising:
   an optical waveguide having one end formed as an inclined plane which is inclined at an angle $\Phi$ with respect to an incident light axis to deliver an incident light emitted from a light source; and
   a nano aperture which changes an energy distribution of the light delivered through the inclined plane to generate an enhanced near-field,
   wherein the angle $\Phi=90°-\theta_{iB}$, where $\theta_{iB}$ represents a Brewster's angle at which only a vertically polarized light of the incident light is reflected.

2. The light delivery module of claim 1, further comprising one of an optical fiber, a prism coupler, and a grating coupler coupling the light from the light source to the optical waveguide.

3. The light delivery module of claim 1, wherein the nano aperture comprises a metal film having a slit formed in a bow-tie shape, an X shape, a C shape or an L-shape.

4. An heat-assisted magnetic recording (HAMR) head disposed on one end of a slider with an air bearing surface, the HAMR head comprising:
   a magnetic path forming unit which forms a magnetic field for recording;
   a light source which emits light; and
   the light delivery module of claim 1 which delivers the light from the light source.

5. The HAMR head of claim 4, wherein the magnetic path forming unit comprises:
   a coil which generates a magnetic field;
   a main pole having a first end which is disposed on a same plane as the air bearing surface;
   a sub yoke disposed on one side of the main pole, the sub yoke having a second end which faces a same direction as the first end of the main pole and is stepped from the first end such that a magnetic field is concentrated on the first end; and
   a return yoke which forms, in association with the main pole, a magnetic path of a magnetic field created around the coil, one end of the return yoke being spaced apart from the main pole, another end of the return yoke being connected to the main pole.

6. The HAMR head of claim 5, wherein at least a portion of the light delivery module is disposed in a space between the first end and the second end.

7. The HAMR head of claim 4, further comprising:
   a first shield disposed on the slider;
   a second shield spaced apart from the first shield; and
   a reading unit disposed between the first shield and the second shield.

8. The HAMR head of claim 7, wherein a surface of each of the first shield, the second shield, and the reading unit is disposed on a same plane as the air bearing surface.

9. The HAMR head of claim 7, wherein a surface of each of the first shield and the reading unit is disposed on a same plane as the air bearing surface, and a surface of the second shield is stepped from the air bearing surface to form a stepped space, and at least a portion of the light delivery module is disposed in the stepped space.

10. The HAMR head of claim 4, wherein the nano aperture comprises a metal film having a slit formed in a bow-tie shape, an X shape, a C shape or an L-shape.

* * * * *